United States Patent
Ding et al.

(10) Patent No.: US 8,494,823 B2
(45) Date of Patent: Jul. 23, 2013

(54) METHOD AND SYSTEM FOR DETERMINING SERVICE AREA OF SUPPLY CHAIN BY SIMULATING SERVICE CYCLE TIME

(75) Inventors: Hong Wei Ding, Beijing (CN); Jin Dong, Beijing (CN); Young Min Lee, Old Westbury, NY (US); Changrui Ren, Beijing (CN); Wei Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 12/043,540

(22) Filed: Mar. 6, 2008

(65) Prior Publication Data

US 2009/0228313 A1 Sep. 10, 2009

(51) Int. Cl.
*G06G 7/48* (2006.01)

(52) U.S. Cl.
USPC .............................................................. 703/6

(58) Field of Classification Search
USPC ..................................... 703/6; 705/26, 10, 1.1
See application file for complete search history.

(56) References Cited

U.S. PATENT DOCUMENTS

| | | | |
|---|---|---|---|
| 4,144,496 A | 3/1979 | Cunningham et al. | |
| 5,485,262 A | 1/1996 | Tsunemiya et al. | |
| 5,699,280 A | 12/1997 | Oda et al. | |
| 6,198,935 B1 | 3/2001 | Saha et al. | |
| 6,549,780 B2 | 4/2003 | Schiff et al. | |
| 7,139,721 B2 * | 11/2006 | Borders et al. | 705/9 |
| 7,257,552 B1 * | 8/2007 | Franco | 705/28 |
| 2002/0156663 A1 * | 10/2002 | Weber et al. | 705/7 |
| 2004/0015378 A1 * | 1/2004 | Casati et al. | 705/7 |
| 2007/0150332 A1 * | 6/2007 | Grichnik et al. | 705/10 |

OTHER PUBLICATIONS

Bagchi et al., Experience using the IBM Supply Chain Simulator, Nov. 1998, pp. 1387-1394.*
Gunasekaran et al., A framework for supply cahin performance measurement, 2003, pp. 333-347.*
Fleisch et al., Inventory inaccuracy and supply chain performace: a simulation study of a retail supply chain, 2004, pp. 373-385.*
Insight Management Support Systems, Strategic Analysis of Integrated Logistics Systems (SAILS), http://www.insight-mss.com/_products/_sails/.
LLamasoft, Supply Chain Guru: Supply Chain Optimization + Simulation, http://www.llamasoft.com/network.html.
i2, i2 Supply Chain Strategist, http://i2.com/assets/pdf/pds_scs_pds7223.pdf.
David O'Sullivan et al., Using Desktop GIS for the Investigation of Accessibility by Public Transport: An Isochrone Approach, International Journal of Geographical Information Science, Jan. 1, 2000, pp. 85-104, vol. 14, No. 1.

* cited by examiner

*Primary Examiner* — Omar Fernandez Rivas
*Assistant Examiner* — Bernard E Cothran
(74) *Attorney, Agent, or Firm* — Scully, Scott, Murphy & Presser, P.C.; Daniel P. Morris, Esq.

(57) ABSTRACT

A method and system for determining supply chain service area by simulating service cycle time. A plurality of simulation parameters including stochastic factors are used with a supply chain simulation model. The supply chain simulation model is run repeatedly and generated simulated data is analyzed to determine service cycle time. The service cycle time is used to compute service area for a facility.

19 Claims, 3 Drawing Sheets

METHOD AND SYSTEM FOR DETERMINING SERVICE AREA OF SUPPLY CHAIN BY SIMULATING SERVICE CYCLE TIME

FIELD OF THE INVENTION

The present application generally relates to supply chain modeling methodology, and more particularly to determining service area of supply chain by simulating service cycle time.

BACKGROUND OF THE INVENTION

Service area is a region that is serviced by a facility in providing various services to customers in that area. Examples of a facility may include but are not limited to distribution centers, manufacturing plants, retail stores and service centers such as repair centers, etc. Examples of services may include but are not limited to transportation, delivery and repair. Service area can also be defined according to different service levels such as one-day delivery area, two-days delivery areas, etc. Service area is used for supply chain network design, facility selection/sizing, sourcing decision, service level management, etc.

A known technique determines service areas deterministically based on distance or transit time shown by the radial diagram in FIG. 4. For example, 410 may represent a distance (for example, 400 miles) that can be reached by a service provider from a facility to customers, for instance, in 2 days. 411 may represent a distance that can be reached by the service provider from a facility to customer in 1 day, for example, 200 miles. Black small circle (402) at the center may represent a facility, and the grey and white circles (e.g., 414 and 415 respectively) may represent customers located with respect to the location of the facility (402). Using 200 miles as a radius, a circle (413) can be drawn, and any customers within the circle can be determined as customers who can be serviced in one day. In the same fashion, another circle (412) can be drawn, and any customers within this circle (412) but outside of the circle (413) can be considered as customers who can be serviced in two days.

However, this traditional method may be inaccurate, for example, in that it ignores stochastic factors such as order processing lead time, supply lead time, transit time variability, resource availability variability, and other factors such as customer requirement and supply chain polices. For example, a customer may be located 150 miles (which is within one day service area according to the FIG. 4) away from the facility, but the product that needs to be delivered to the customer may take long time to package, require special component that needs to be acquired from other supplier, and the customer may be located in mountain area which takes long time to reach, etc. In this case, it may take 3 days, rather than one day, to deliver the product to the customer after the order is received.

Inaccurate determination of service areas negatively impacts customer services, inventory and costs, revenue, profit, and efficiency of supply chain. Thus, it is desirable to have a method and system that can more accurately determine a service area. For example, the known method in the above example would determine the delivery time to be within 1 day, when it would actually take 3 days. When the customer places an order, the customer would be told that the good will be delivered in one day. Failing to fulfill this promise may cause customer dissatisfaction.

BRIEF SUMMARY OF THE INVENTION

A method and system for determining supply chain service area are provided. The method in one aspect may comprise establishing a plurality of simulation parameters to include stochastic factors for use with a supply chain simulation model; running said supply chain simulation model with said simulation parameters repeatedly; analyzing data output from said repeated runs of said supply chain simulation model to determine service cycle time; and using said service cycle time to compute service area for a facility.

A system for determining supply chain service area, in one aspect, may comprise means operable to execute on the processor for establishing a plurality of simulation parameters to include stochastic factors for use with a supply chain simulation model; means operable to execute on the processor for running said supply chain simulation model with said simulation parameters repeatedly; means operable to execute on the processor for analyzing data output from said repeated runs of said supply chain simulation model to determine service cycle time; and means operable to execute on the processor for using said service cycle time to compute service area for a facility.

A program storage device readable by a machine, tangibly embodying a program of instructions executable by the machine to perform above method for determining supply chain service area may be also provided.

Further features as well as the structure and operation of various embodiments are described in detail below with reference to the accompanying drawings. In the drawings, like reference numbers indicate identical or functionally similar elements.

DETAILED DESCRIPTION

A method and system are provided that determine a service area based on service cycle time. For instance, a supply chain service area may be determined by simulating service cycle time between facilities and customers. The method and system of the present disclosure simulates service cycle time in one embodiment by using one or more stochastic factors that influence the service cycle time. Examples of stochastic factors may include but are not limited to order processing lead time, supply lead time, resource availability variability, transit time variability, and customer requirement, etc. In addition, supply chain policies such as inventory policies and sourcing policies may be used as factors, parameters or attributes in the simulation.

Figure 1:
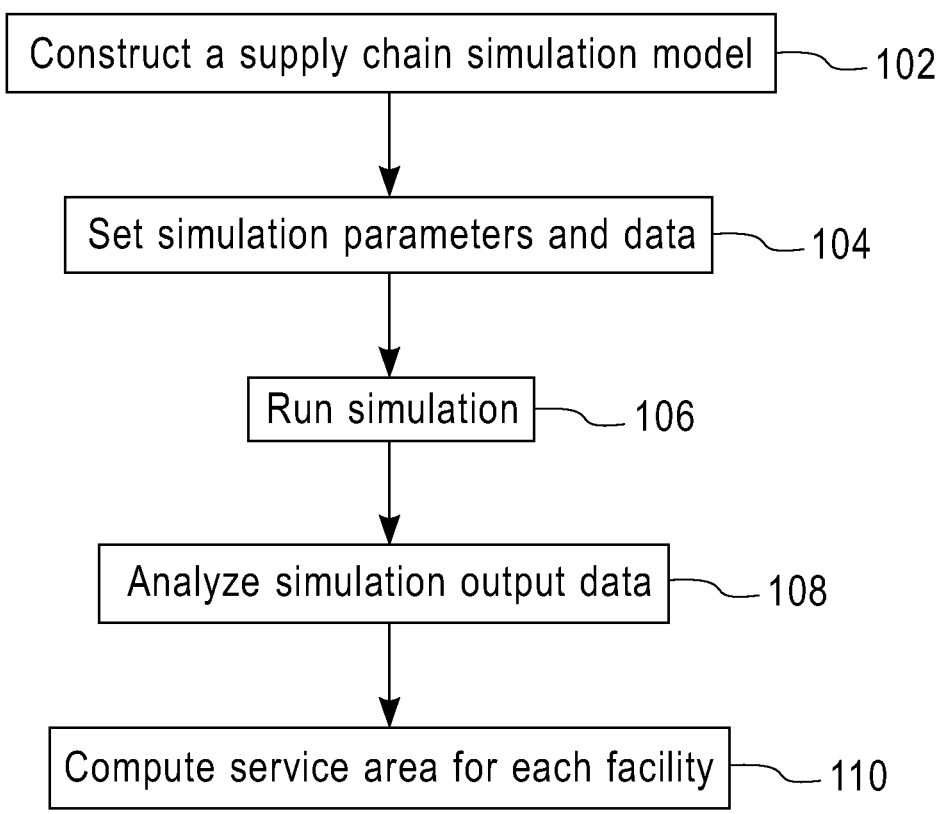
FIG. 1 is a flow diagram illustrating a method of determining service area in one embodiment of the present disclosure.

FIG. 1 is a flow diagram illustrating a method of determining service area according to one embodiment of the present disclosure. At 102, a supply chain simulation model is constructed. In one embodiment, the simulation model may include network structure that has nodes representing facilities and customers, and links representing services that can be provided from the facility to the customer locations. The network structure is similar to the structure shown in FIG. 3 and FIG. 4, facility and customers represented by nodes or small circles, and links connecting them. The flow of information and goods (or services) between supplier (facility) and customers, and processing steps are described with reference to FIG. 2 below. In one embodiment of the method of the present disclosure, the simulation model manipulates an ordered event list and a simulation clock. The simulation model advances the simulation time and triggers simulation events based on one or more rules, so as to simulate customer orders being received and fulfilled through the processing steps described in the simulation model.

At 104, simulation parameters and data are set. A user or a modeler may set the parameters based on business scenarios and/or needs. Such parameters and data may include but are not limited to: demand forecasting volume and error, order processing lead time, transportation lead time and/or transportation policy, manufacturing resources, inventory control policy and sourcing policy, etc. Demand forecasting volume refers to the quantity of products that are estimated to be purchases by customers. Demand forecasting error is the error of forecasted volume, and may be expressed as a value or set of values such as variances, percentage, rate, etc. Order processing lead time refers to the time required to process one customer order. Transportation lead time refers to the time required to ship products from facility to customer. Transportation policy is used to determine the method of transportation, such as use of small truck, train or other special vehicle designed to transport special products. Manufacturing resources are used to build or assemble products that are being purchased from components or raw materials. Inventory control policies are used to determine whether or not to replenish inventory, when, and/or quantity of products needed to be supplied at the facility. Sourcing policy is used to determine from which suppliers to purchase products (or components) that is being sold or shipped to customers.

Figure 2:
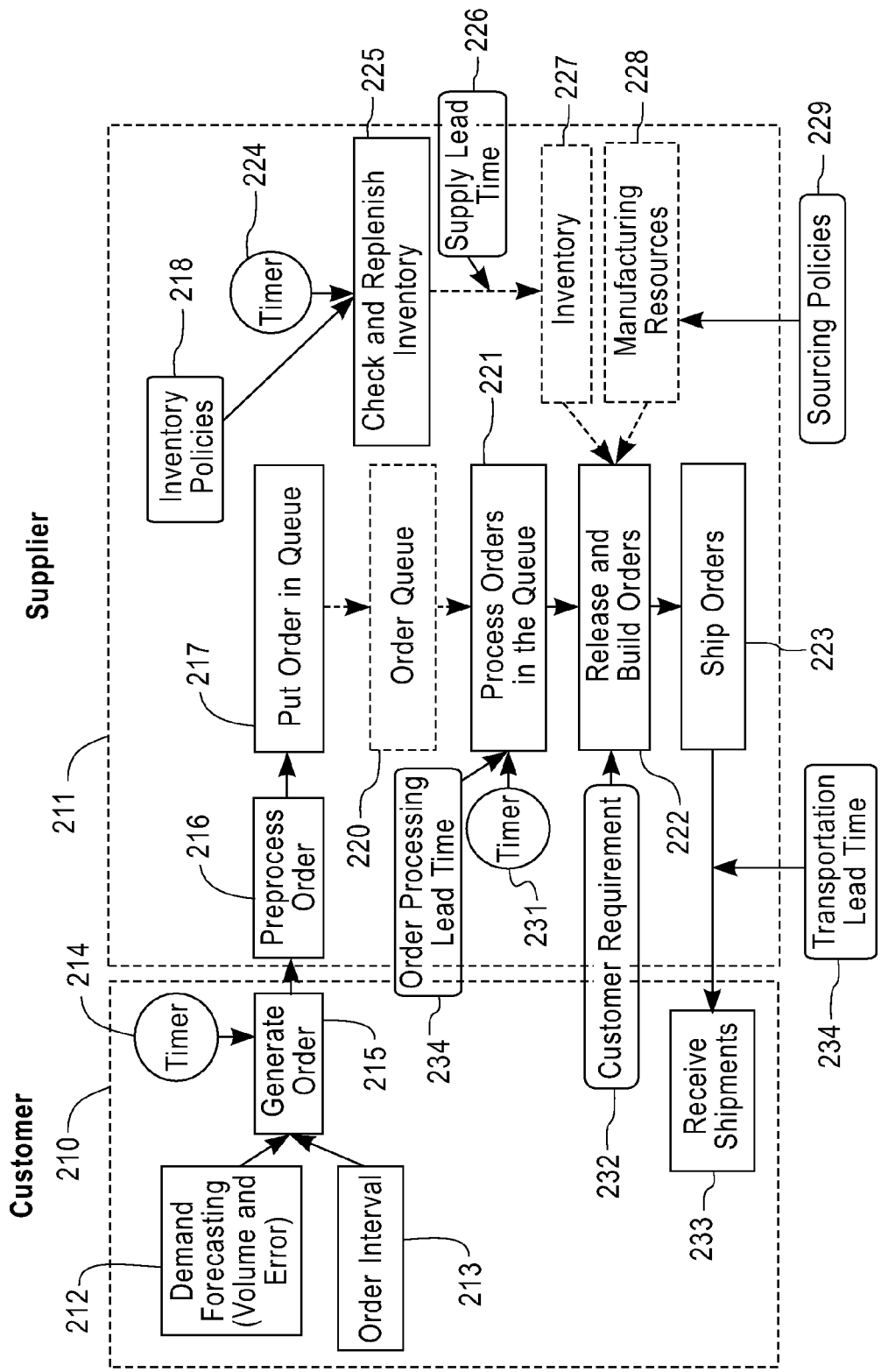
FIG. 2 is a diagram illustrating simulation of information flows and material flows between facility (supplier) and customer in one embodiment of the present disclosure.

At 106, simulation is run or executed. A simulation run, for example, generates customer orders, handles incoming orders with order queue and lead time, builds orders with manufacturing resources, records order entry date and arrival date for each customer order, checks and replenishes inventory periodically. Details of simulation steps are shown in FIG. 2. Simulation runs may be replicated many times, that is, many simulation runs may be repeated many times.

At 108, the outputs from the simulation runs are analyzed. For instance, using the data from the simulation run, the following metrics may be calculated: Order-to-Delivery time (ODT) for each customer; and average Order-to-Delivery time for each facility/demand pair. A facility/demand pair refers to a facility and its customer. Customer orders are placed by customers, fulfilled by facilities, and finally delivered to the customers—the Order-to-Delivery time refers to the total time from customer order generation to final delivery. For each facility/demand pair, there may be many customer orders. For each customer order, Order-to-Delivery can be calculated, and the average Order-to-Delivery time for the facility/demand pair may be determined, for instance, as the mean of all the values of Order-to-Delivery time. Other statistical method may be used to determine the average Order-to-Delivery time. A user may manually analyze the output. In another embodiment, this analysis may be automated. For example, a computer program executing on a processor, may automatically perform the analysis and produce a report based on the analysis.

Figure 3:
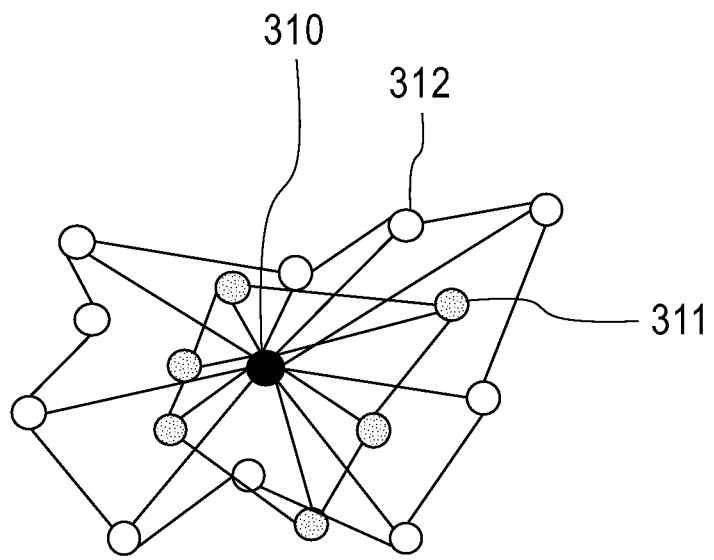
FIG. 3 is a diagram illustrating defined service areas using the method of the present disclosure in one embodiment.
Figure 4:
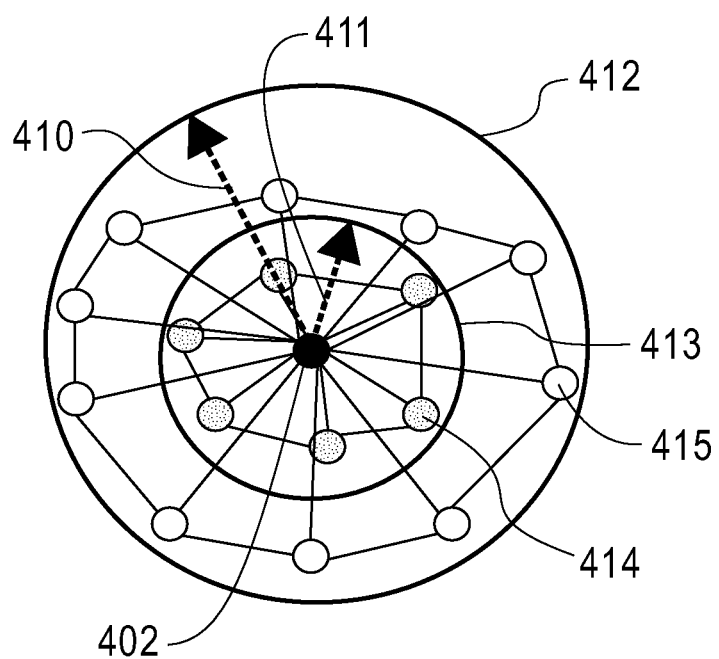
FIG. 4 is a diagram illustrating defined service area according to the known methodology of using distance or travel time.

At 110, service area for each facility is computed. The average Order-to-Delivery for each facility/demand pair may be calculated as described in the previous step. Each facility has a list of corresponding customers, and therefore, may have a plurality of different average Order-to Delivery time for different customers. Thus, each facility may be associated with a plurality of facility/demand pair and corresponding average Order-to Delivery time. For each facility, there may be a list of customers whose average OTD is less than 1 day, a list of customers whose average OTD is greater than 1 day but less than 2 days, etc. Using this information, service areas can be constructed by connecting the facilities with customers. For each facility, several service areas can be computed for different levels of Order-to-Delivery. One embodiment of the service area determined in this method is shown in FIG. 3.

FIG. 2 is a diagram illustrating simulation of information flows and material flows between facility (supplier) (211) and customer (210) in one embodiment of the present disclosure. The customer (210) model is simulated to periodically generate customer orders, which are fulfilled by the supplier (211) model; after the supplier (211) processes the customer orders (215), corresponding shipments are sent to the customer (210). The customer orders are generated (215), for example, by a simulator, based on demand forecast (212) and order interval (213). Demand forecast (212) describes the forecasted demand volume and forecast error, e.g., the probability of error in the forecast; order interval (213) is the time interval between any two customer orders. A timer (214) is in place to control triggering of generating customer orders. In the supplier side (211), there is an order queue 220 for holding incoming customer orders. A customer order received at the supplier is put in the order queue (220) as shown at (217) after being preprocessed at (216). There may be one or more order queues (220). For example, order queues (220) may be classified or categorized according to a desired or predetermined criteria. Preprocessing (216) may include parsing the order data into different attributes such as customer information, product information, requested delivery date, types of order, quantity of order, etc. For instance, different orders may be placed in different order queues (220) according to the preprocessing step (216).

A timer (231) on the supplier side controls triggering a process periodically to process (221) the customer orders in the order queue (220). Processing step (221) may include fulfilling the orders. The processing time for each customer order is determined by the parameter of order processing lead time (234). If a customer order can be released, based on customer requirement (232), the products requested by this customer order are either moved out from the inventory directly or built with manufacturing resources as shown in (222). Inventory (227) is checked (225) to determine whether there are resources available in the inventory to fulfill the order. In the supplier (211) model, another timer (224) may control triggering of the replenishment process (225) of inventory. One or more inventory policies are used to determine the time and quantity of replenishment. The replenishment time is determined by the parameter of supply lead time (226). The replenishment of manufacturing resources (228) is determined by one or more sourcing policies (229). Then the products are shipped (223) to the customer. The shipping time is determined by the parameter of transportation lead time (234). Customer receives the shipment (233). In one embodiment, the steps described in FIG. 2 are executed for each order. Many orders are simulated in this method to generate sufficient information for determining service area.

In the above simulation methodology, parameters such as the above described various lead time parameters may be parameterized, that is, input or adjusted, for example, based on historical data or knowledge base. A simulation modeler or a person running the model may enter or adjust the parameters. In another embodiment, parameterization, that is, entering and adjusting of the parameters may be performed automatically, for example, by an automated software or machine or like. Such parameterization may be based on historical data, knowledge base, or past data output from the simulation runs and learned by the automated software or machine or like.

FIG. 3 is a diagram illustrating an example of defined service areas using the method of the present disclosure in one embodiment. The black circle (310) in the middle represents a supplier (facility); the gray circles (311) and white circles (312) represent its customers. The interaction between the customers and the supplier is simulated as illustrated in FIG. 2. During the simulation, multiple customer orders are generated and processed, and multiple orders for each customer may be generated and processed. In one embodiment, the cycle time may be determined by using the distribution of Order-to-Delivery time (ODT) for each customer order, and calculating the average of all Order-to-Delivery time for each customer. In another embodiment, based on the distribution of Order-to-Delivery time simulated, cumulative distribution information that corresponds to a service level target of the particular customer may be used in determining the cycle time. A service level target, briefly, refers to the level of service desired to be achieved. Yet in other embodiments, the simulated ODT may be used in combination with one or more other statistical criteria to determine the cycle time. In the example shown in FIG. 3, grey circles have smaller average Order-to-Delivery (for example, 1 days service), and white circles have larger average Order-to-Delivery time (form example, 2 day service). Two service areas are constructed by connecting all grey circles and all white circles respectively.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer implemented method for determining supply chain service area, comprising:

establishing a plurality of simulation parameters to include stochastic factors for use with a supply chain simulation model;

running said supply chain simulation model with said simulation parameters repeatedly;

analyzing data output from said repeated runs of said supply chain simulation model to determine service cycle time; and computing service area for a facility based on said supply chain simulation runs including the service cycle time, the service area being a geographic region that is serviced by the facility in providing various services to customers in that area, the service area computed by a processor, by geometrically connecting the facility with each of the customers that has same order-to-delivery time from the facility, the order-to-delivery time automatically estimated based on the simulation runs, and geometrically connecting said customers, wherein a plurality of the service areas are computed for different levels of the order-to-delivery time associated with the facility, wherein the stochastic factors include order processing lead time and associated variability, supply lead time and associated variability, resource availability and associated variability, transit time and associated variability, or customer requirement, or combinations thereof, and wherein one or more of the simulation parameters can be parameterized based on historical data.

2. The method of claim 1, wherein the step of establishing further includes establishing one or more supply chain policies as simulation parameters.

3. The method of claim 2, wherein said supply chain policies include inventory policies, sourcing policies, or combinations thereof.

4. The method of claim 1, wherein the step of analyzing data output includes analyzing generated order-to-delivery cycle time for a customer order.

5. The method of claim 1, wherein the step of analyzing data output includes generating average order-to-delivery for a facility-customer pair.

6. The method of claim 1, wherein the step of using said service cycle time to compute service area for a facility includes generating service area for each facility by service level according to said service cycle time to customers.

7. The method of claim 1, wherein the step of analyzing data output includes generating service cycle time based on simulated distribution of order-to-delivery and service level target for a customer.

8. The method of claim 1, further including:
constructing a supply chain simulation model.

9. The method of claim 1, wherein the supply chain simulation model generates a plurality of order-to-delivery for one or more customers.

10. The method of claim 1, wherein a plurality of service areas is computed for the facility, each of the plurality of services areas based on a different service cycle time.

11. The method of claim 1, wherein the computing service area for a facility based on said supply chain simulation runs including the service cycle time comprises selecting a plurality of customer locations to where an order-to delivery time from the facility is within a selected service cycle time, wherein the service area is computed by a boundary formed by connecting said selected plurality of customer locations.

12. A non-transitory program storage device readable by a machine, tangibly embodying a program of instructions executable by the machine to perform a method for determining supply chain service area, comprising:

establishing a plurality of simulation parameters to include stochastic factors for use with a supply chain simulation model;

running said supply chain simulation model with said simulation parameters repeatedly;

analyzing data output from said repeated runs of said supply chain simulation model to determine service cycle time; and computing service area for a facility based on said supply chain simulation runs including the service cycle time, the service area being a geographic region that is serviced by the facility in providing various services to customers in that area, the service area computed by a processor, by geometrically connecting the facility with each of the customers that has same order-to-delivery time from the facility, the order-to-delivery time automatically estimated based on the simulation runs, and geometrically connecting said customers, wherein a plurality of the service areas are computed for different levels of the order-to-delivery time associated with the facility, wherein the stochastic factors include order processing lead time and associated variability, supply lead time and associated variability, resource availability and associated variability, transit time and associated variability, or customer requirement, or combinations thereof, and wherein one or more of the simulation parameters can be parameterized based on historical data.

13. The program storage device of claim 12, wherein the stochastic factors include resource availability and associated variability or customer requirement or combination thereof.

14. The program storage device of claim 12, wherein the step of analyzing data output includes generating average order-to-delivery for a facility customer pair.

15. The program storage device of claim 12, wherein the step of using said service cycle time to compute service area for a facility includes generating service area for each facility by service level according to said service cycle time to customers.

16. The program storage device of claim 12, wherein the step of analyzing data output includes generating service cycle time based on simulated distribution of order-to-delivery and service level target for a customer.

17. The program storage device of claim 12, wherein the supply chain simulation model generates a plurality of order-to-delivery for one or more customers.

18. A system for determining supply chain service area, comprising:

a processor;

means operable to execute on the processor for establishing a plurality of simulation parameters to include stochastic factors for use with a supply chain simulation model;

means operable to execute on the processor for running said supply chain simulation model with said simulation parameters repeatedly;

means operable to execute on the processor for analyzing data output from said repeated runs of said supply chain simulation model to determine service cycle time; and means operable to execute on the processor for computing service area for a facility based on said supply chain simulation runs including the service cycle time, the service area being a geographic region that is serviced by the facility in providing service to customers in that area, the service area computed by a processor, by geometrically connecting the facility with each of the customers that has same order-to-delivery time from the facility, the order-to-delivery time automatically estimated based on the simulation runs, and geometrically connecting said customers, wherein a plurality of the service areas are computed for different levels of the order-to-delivery time associated with the facility, wherein the stochastic factors include order processing lead time and associated variability, supply lead time and associated variability, resource availability and associated variability, transit time and associated variability, or customer requirement, or combinations thereof, and wherein one or more of the simulation parameters can be parameterized based on historical data.

19. The system of claim 18, wherein the means for analyzing data output generates service cycle time based on simulated distribution of order-to-delivery and service level target for a customer.

* * * * *